(12) United States Patent
Takahashi

(10) Patent No.: US 7,420,798 B2
(45) Date of Patent: Sep. 2, 2008

(54) PORTABLE MICROCOMPUTER AND DISPLAY UNIT

(75) Inventor: Hiroyuki Takahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 435 days.

(21) Appl. No.: 11/168,437

(22) Filed: Jun. 29, 2005

(65) Prior Publication Data

US 2006/0181843 A1   Aug. 17, 2006

(30) Foreign Application Priority Data

Feb. 14, 2005   (JP) .............................. 2005-036886

(51) Int. Cl.
 *G06F 1/16* (2006.01)
(52) U.S. Cl. ........................................ 361/681; 345/58
(58) Field of Classification Search .................. 361/681; 349/58
 See application file for complete search history.

(56) References Cited

U.S. PATENT DOCUMENTS

| 5,568,357 | A | * | 10/1996 | Kochis et al. | ............... 361/681 |
| 6,144,552 | A | * | 11/2000 | Whitcher et al. | ............ 361/681 |
| 6,532,152 | B1 | * | 3/2003 | White et al. | ................. 361/692 |
| 6,919,937 | B2 | * | 7/2005 | Kim et al. | ...................... 349/58 |
| 2001/0036057 | A1 | * | 11/2001 | Fukuyoshi | .................. 361/681 |
| 2002/0186526 | A1 | * | 12/2002 | Kim | .......................... 361/681 |

FOREIGN PATENT DOCUMENTS

| JP | 2001-345565 | 12/2001 |
| JP | 2004-251938 | 9/2004 |

* cited by examiner

*Primary Examiner*—Lisa Lea-Edmonds
(74) *Attorney, Agent, or Firm*—Oblon, Spivak, McClelland, Maier & Neustadt, P.C.

(57) ABSTRACT

A display unit includes a display panel, a casing covering the rear surface of the display panel, and a front panel extending around in front of a periphery of the display panel and supporting the display panel. The front panel protects the display panel against impact loads applied thereto.

18 Claims, 10 Drawing Sheets

PORTABLE MICROCOMPUTER AND DISPLAY UNIT

CROSS REFERENCE TO RELATED APPLICATIONS

This application is based upon and claims the benefit of priority from prior Japanese Patent Application 2005-036886 filed on Feb. 14, 2005, the entire contents of which are incorporated by reference herein.

BACKGROUND OF THE INVENTION

1. Field of the Invention

The present invention relates to a portable microcomputer, and a display unit.

2. Description of the Related Art

At present, laptops (i.e., portable microcomputers) are designed to be compact, light in weight and easy to carry. Such a portable microcomputer (called the "microcomputer") may be dropped while it is being carried by a user. A liquid crystal display unit, one of heavy components of the microcomputer, tends to be easily damaged. There has been a strong demand for a sturdy microcomputer of which display unit is slow to be damaged and resistant to dropping impacts.

In a display unit a conventional microcomputer, a liquid crystal display panel (called the "display panel") is fixed to a casing using a elastic support which is made of a U-shaped metal plate. The casing and elastic support are fastened using screws, and the elastic support and display panel are fastened using screws.

A mask plate is provided around a front part of the display panel, and covers an area where the display panel is fastened to the casing.

The casing houses the display unit, and supports the display panel via the elastic support. If the display unit is dropped, shocks are directly applied to the casing. The shocks applied to the casing may not be sufficiently attenuated before they pass on to the display panel via the elastic support. In such a case, the display panel may undergo local impact loads coming from the casing via the elastic support, and may be damaged near the elastic support.

On the other hand, it has been contemplated to surround the display panel with a rubber pad or the like. In such a display unit, a mask plate is provided around the display panel in order to cover an area except for a display screen.

The display panel having the rubber pad is relatively free from impact loads applied locally thereto, and more resistant to impact loads compared with the first-mentioned display panel.

It is assumed here that the microcomputer is provided with the display panel supported by the casing using the rubber pad or like. If the microcomputer is dropped by a user in a standing position, the display panel will be damaged.

Therefore, it is very difficult to sufficiently alleviate impact loads applied to the display panel only by covering the periphery of the display panel using the rubber pad or the like, and to protect the display panel against excessive forces.

Japanese Patent Laid-Open Publication (Kokai) No. 2001-345565 discloses an electronic device including cushions which absorb large impact loads by plastic deformation. The cushions seem to protect the display panel against damages even when the microcomputer is dropped.

The cushions of the foregoing citation undergo plastic deformation and absorb impact loads. Therefore, such cushions should be replaced in order to reuse the display panel, which is very troublesome.

An object of the present invention is to provide a portable microcomputer and a display unit which are resistant to damages caused by impact loads.

BRIEF SUMMARY OF THE INVENTION

According to a first aspect of the embodiment of the invention, there is provided a display unit comprising: a display panel; a casing covering a rear surface of the display panel and being out of contact with the display panel; and a front panel joined to the casing, extending around in front of a periphery of the display panel, and supporting the display panel.

In accordance with a second aspect, there is provided a portable microcomputer comprising: a main body including a keyboard on one surface thereof; a display unit which is freely opened and closed with respect to the main body, and includes a display panel facing the keyboard of the main body when closed; a casing covering the rear surface of the display panel and being out of contact with the display panel; and a front panel joined to the casing, extending around in front of a periphery of the display panel, and supporting the display panel.

DETAILED DESCRIPTION OF THE INVENTION

Figure 1:
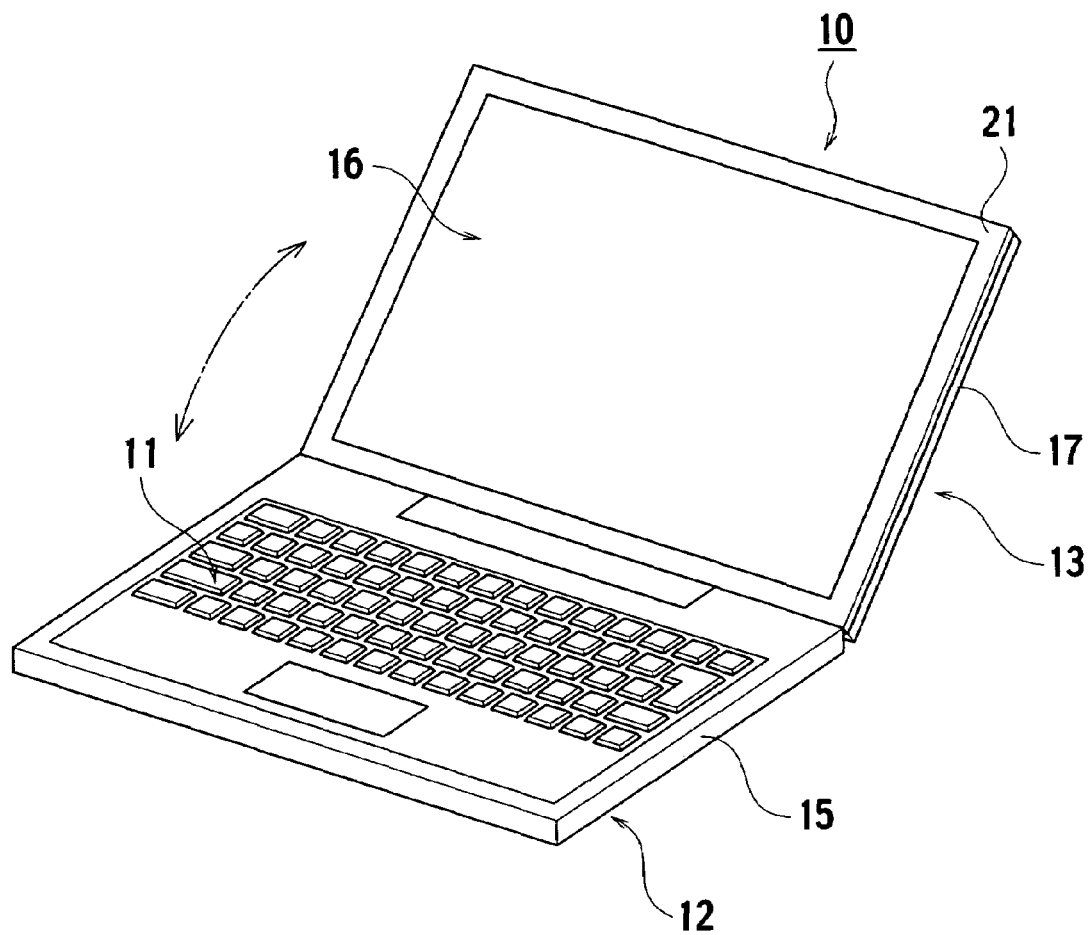
FIG. 1 is a perspective view of a portable microcomputer according to a first embodiment of the invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIRST EMBODIMENT

Referring to FIG. 1, a portable microcomputer 10 (called the microcomputer 10) comprises a main body 12 having a keyboard 11, and a display unit 13 which is joined to the main body 12, and is freely opened and closed.

In the main body 12, a casing 15 accommodates a mother board including a central processing unit (CPU), a memory and so on, and a hard disc (HDD). With the display 13, a display panel 16 has its rear surface and periphery covered by a cuboid casing 17 made of a metal or resin material.

Figure 2:
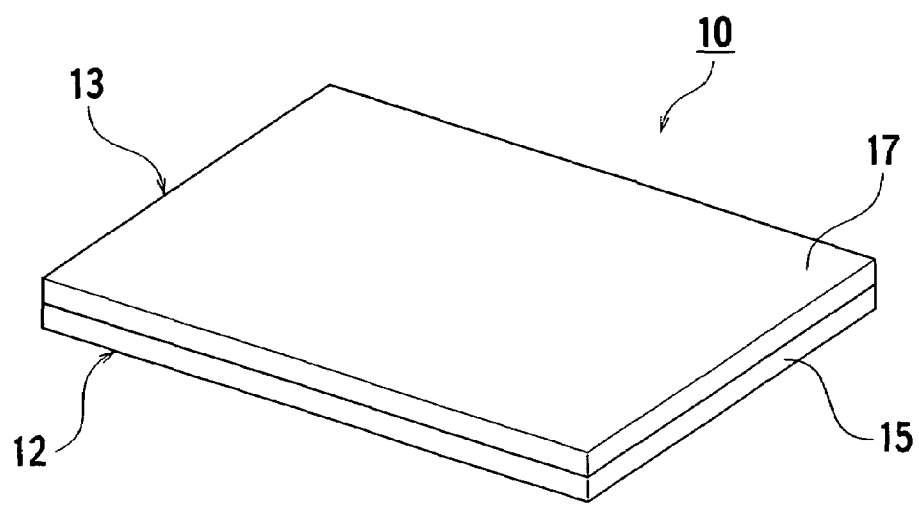
FIG. 2 is a perspective view of the microcomputer with a main body and a display unit closed.

The main body 12 and the display unit 13 are joined at their side edges. Specifically, the casing 17 housing the display unit 13 is closed as shown in FIG. 2. In FIG. 2, the display unit 13 faces with the keyboard 11. At the same time, the display unit 13 is opened, as shown in FIG. 1.

Figure 3:
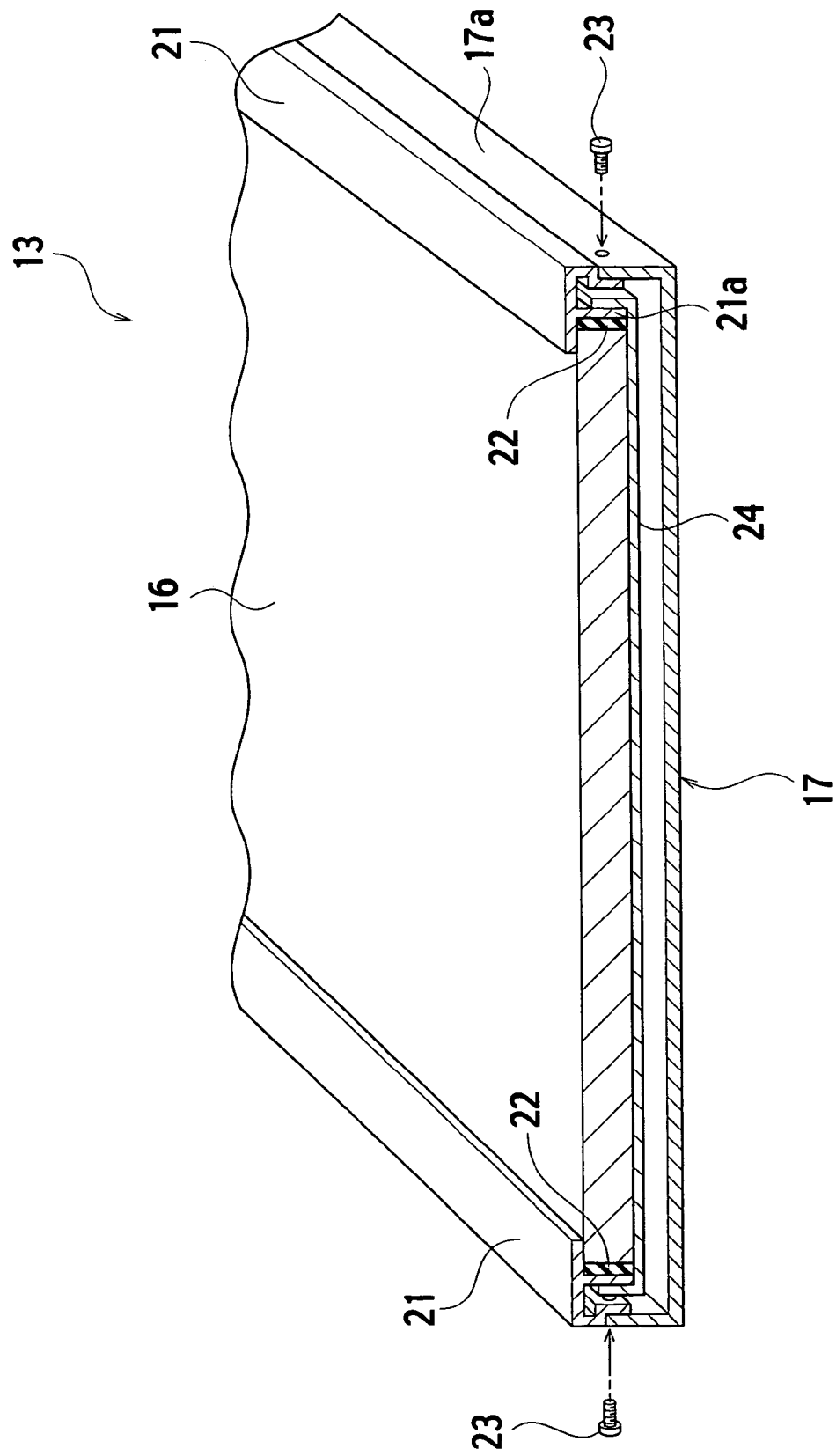
FIG. 3 is a cross-section of the display unit.

A shown in FIG. 3, the display panel 16 is housed in an open space of the casing 17, and fixed thereto via a metal or resin mask 21 (i.e., a front panel), and rubber cushions 22 or the like. The rubber cushions 22 have an elastic coefficient smaller than that of the mask 21. The mask 21 and the casing 17 may be made of a metal such as an aluminum alloy or a magnesium alloy, or a resin material such as polycarbonate. Alternatively, the cushions 22 may be made of rubber, gel elastomer, or soft urethane foam which has a smaller elastic coefficient than that of the mask 21 and casing 17.

The mask 21 is in the shape of a frame, and is fastened to the casing 17 using screws 23 so as to cover the periphery of the display panel 16.

Figure 4:
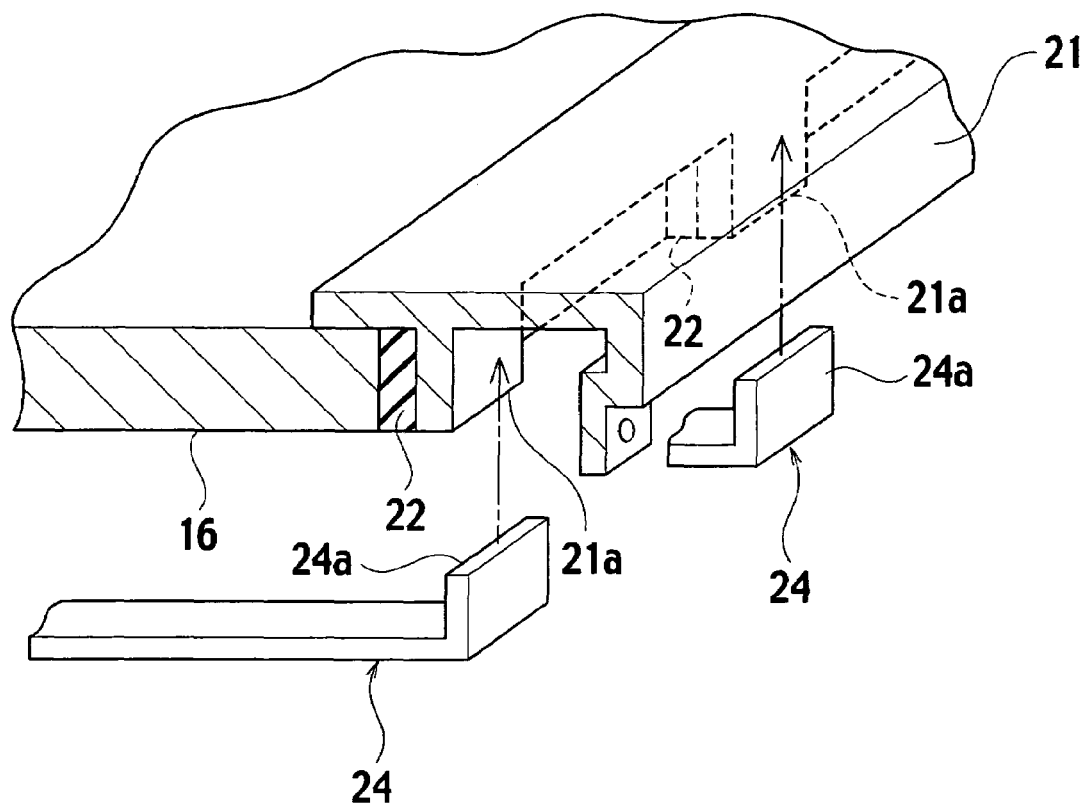
FIG. 4 shows a manner in which a liquid crystal display panel (called the "display panel") is attached.

As shown in FIG. 4, the mask 21 is provided with ribs 21a, which are uniformly spaced and hold the display panel 16 via the cushions 22. Rectangular support bars 24 having folded ends also hold up the ribs 21a, cushions 22 and display panel 16. The support bars 24 are fixed to the ribs 21a using double-faced tapes or an adhesive.

Figure 5:
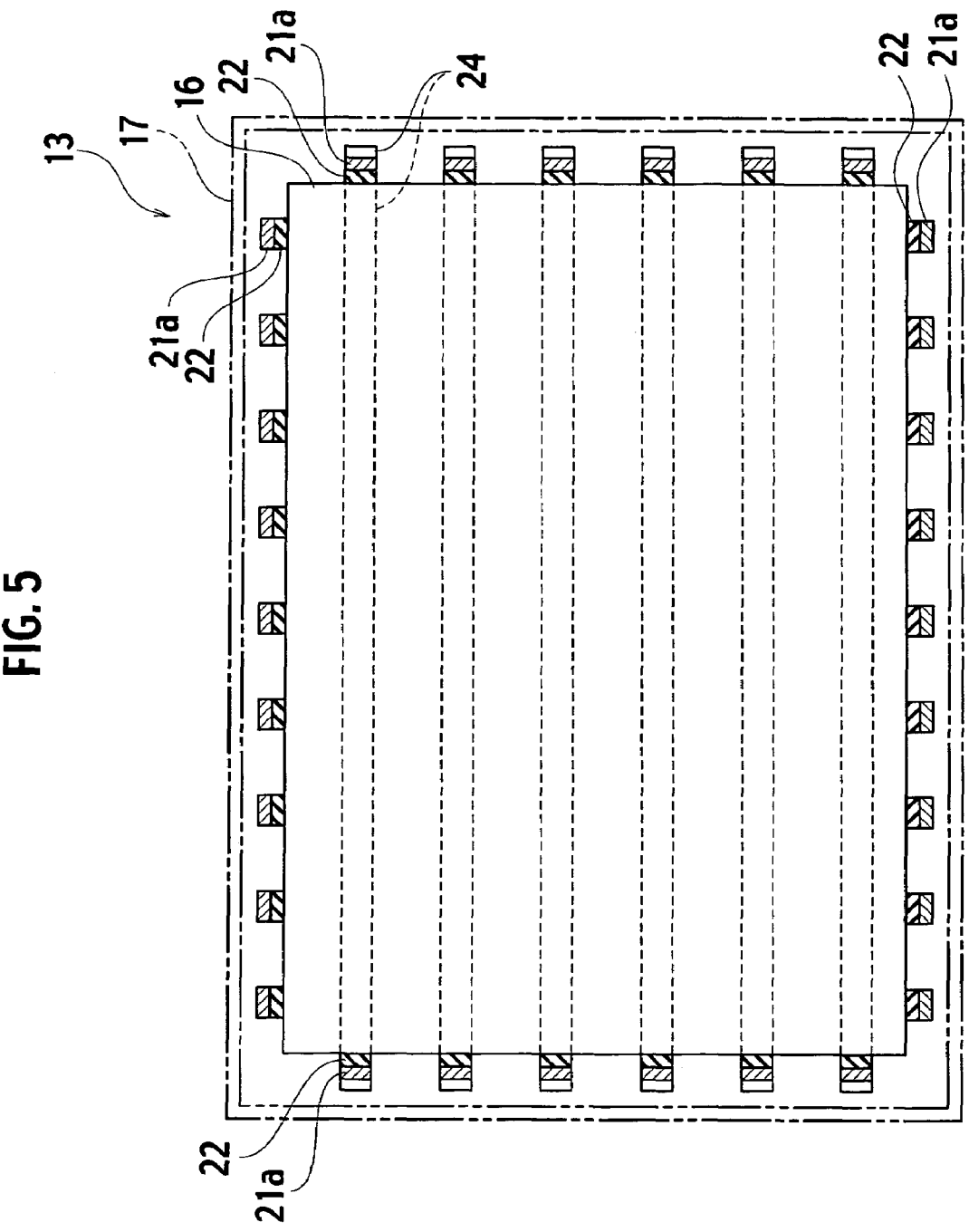
FIG. 5 shows the arrangement of ribs and cushions on the display unit.

Referring to FIG. 5, the display panel 16 has its periphery supported by the uniformly spaced ribs 21a via the cushions 22. Therefore, the masks 21 and cushions 22 prevent impact loads from being directly applied to the display panel 16 via the casing 17.

Figure 6:
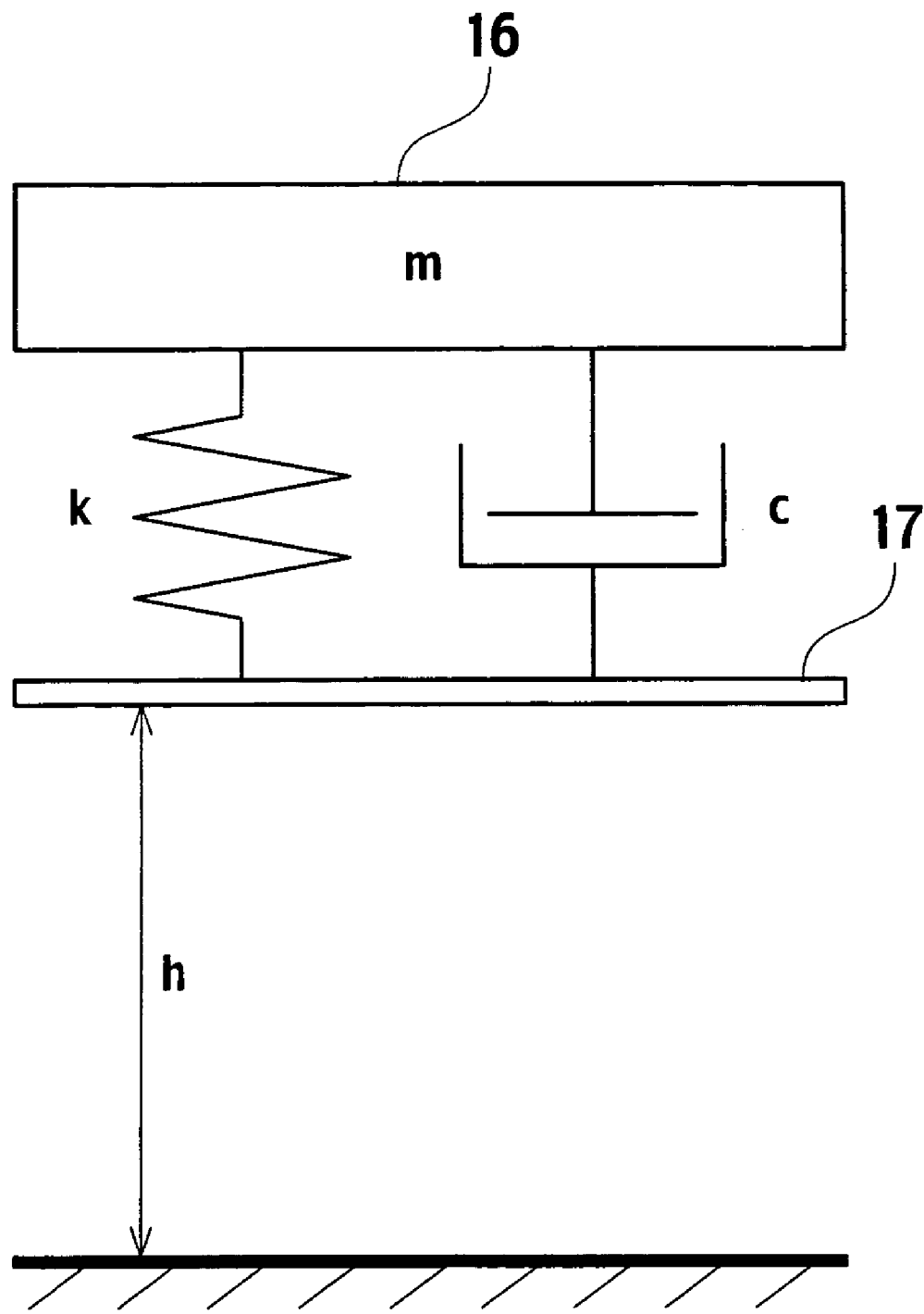
FIG. 6 schematically shows an impact load transmitting path.

Referring to FIG. 6, it is assumed that the microcomputer 10 is dropped. The force $F_{MAX}$ applied to the display panel 16 can be derived in terms of 1-degree-of freedom vibrations on the basis of the following formulas using a dynamic equation.

$$F_{MAX} \approx \sqrt{2mghk}\left(1 - \frac{\pi}{2}\xi\right)$$

$$\xi = \frac{c}{2\sqrt{mk}}$$

where: "m" represents the mass of the display panel 16; "g" represents an acceleration of gravity; "h" represents an altitude from which the display unit is dropped; "k" represents a spring constant; "c" represents an attenuation constant; and "ξ" represents an attenuation ratio. However, the mass and a coefficient of restitution of the casing 17 are disregarded.

As can be seen from the foregoing formulas, the force $F_{MAX}$ applied to the display panel 16 should be minimized by reducing the spring coefficient "k" between the casing 17 and the display panel 16, or by increasing the attenuation constant "c" between the casing 17 and the display panel 16. In this embodiment, the mask 21 and cushions 22 are interposed between the casing 17 and the display panel 16, thereby serving as an impact load transmitting path through which impact loads are transmitted. This is effective in reducing the spring constant "k" between the casing 17 and the display panel 16. The cushions 22 are made of an elastic material having a smaller elasticity coefficient than that of the mask 21. For instance, when the mask 21 and the cushions 22 have an equal spring coefficient, the spring constant can be halved in the impact load transmitting path.

The mask 21 is made of a metal or resin material. For instance, a Young's modulus of an aluminum alloy is 70000 MPa while that of a polycarbonate resin group is 3000 MPa. The mask 21 is preferably made of a resin material in order to reduce the spring constant. In this instance, casing 17 is made of a metal or resin material, and the mask 21 is made of a resin material which has a equal or small spring constant compared to a spring constant of the casing 17.

The mask 21 is attached to the display panel 16 using the ribs 21a, folded parts 24a of the support bars 24, and the double-faced adhesive tape or adhesive. If impact loads are applied to the microcomputer 10, this structure is effective in suppressing that the deformation is restricted at positions where the mask 21 and the display panel 16 are fixed, and preventing the spring constant from increasing, compared with the case in which the mask 21 and the display panel 16 are tightened using screws or the like.

Referring to FIG. 5, the mask 21 has a number of ribs 21a which are spaced apart around the periphery of the display panel 16. These ribs 21a suppress that the deformation is restricted at the positions where the display panel 16 and the mask 21 are fixed, compared with a case in which one rib 21 extends along the periphery of the display panel 16. This is also effective in preventing the increase of the spring constant.

Further, the ribs 21a reliably support the periphery of the display panel 16, and effectively prevent the displacement of the mask 21 and the display panel 16.

Still further, the display panel 16 and mask 21 can be easily engaged with one another via the spaced cushions 22.

With the microcomputer 10, when the main body 12 and the display unit 13 are opened, the keyboard 11 and the display panel 16 will be exposed as shown in FIG. 1.

The microcomputer 10 will be carried with the main body 12 and the display unit 13 closed. In this state, the display panel 16 faces with the keyboard 11, and the casing 17 covers the rear and periphery of the display panel 16. If the microcomputer 10 is dropped, impact loads are directly applied to the casing 17, but not to the mask 21. In short, the display panel 16 is supported by the mask 21 which is not directly affected by impact loads. Therefore, impact loads are transmitted to the display panel 16 via the casing 17, mask 21 and cushions 22. The mask 21 and cushions 22 constitute the impact load transmitting path, which functions as springs, and sufficiently attenuates impact load applied to the casing 17 from an outside.

The microcomputer 10 of the foregoing embodiment can efficiently protect the display panel 16 against damages.

The mask 21 and cushions 22 have an extensively reduced spring constant "k", and can be continuously used without replacement even when impact loads are applied thereto, compared with the structure of the related art in which plastic deformation of cushions is utilized.

Further, even when impact loads are applied, the mask 21 and the display panel 16 will not be displaced each other, which prevents the display panel 16 from being exposed at a part except for the display screen.

Figure 7:
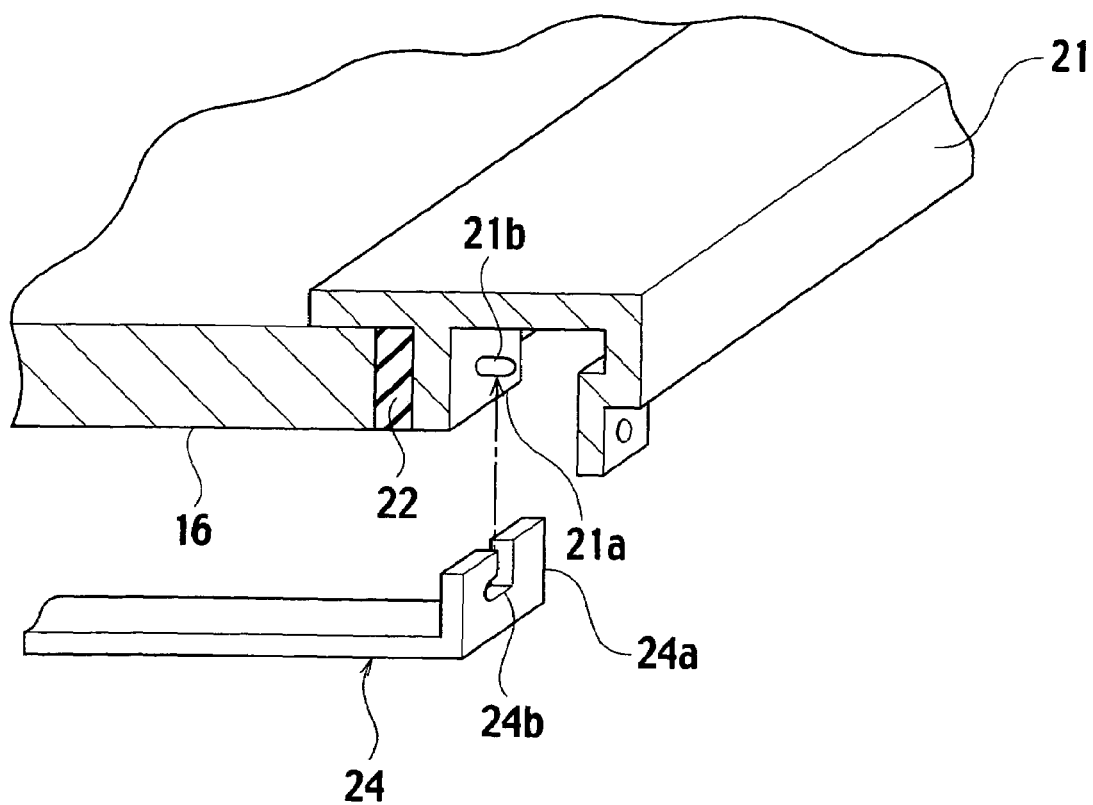
FIG. 7 shows a manner to attach supports to the display unit.

In the first embodiment, the adhesive is used to fix the folded parts 24a of the support bars 24 and the ribs 21a. Alternatively, as shown in FIG. 7, projections 21b may be provided on the ribs 21a, and cuts 24b may be formed in the support bars 24, so that the projections 21b may be fitted into the cuts 24b. This enables the ribs 21a to be engaged with the support bars 24 without using any adhesive, and simplifies an assembly process.

The cushions 22 are made of a material such as rubber having a smaller elastic coefficient than that of the mask 21. Alternatively, the cushions 22 may be made of a material such as a resin or metal which has an elastic coefficient equal to that of the mask 21, or may be made of a material having an elastic coefficient equal to or less than that of the casing 17. Even when the number of components of the impact load transmitting path is increased, the spring constant "k" can be further reduced.

Figure 8:
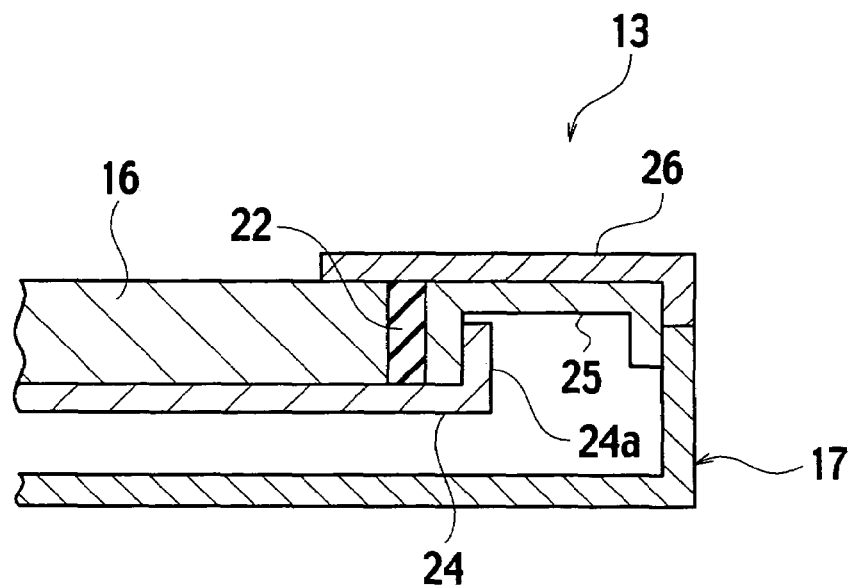
FIG. 8 is a cross section showing another manner of attaching the display panel in the microcomputer of FIG. 1.

The display panel 16 is supported by the ribs 21a of the mask 21 via the cushions 22 in the first embodiment. Alternatively, as shown in FIG. 8, the display panel 16 may be supported using supports 25 which are separate from a mask 26, and is made of a metal, a resin material or a material having a small elastic coefficient compared to that of the mask 26.

SECOND EMBODIMENT

Figure 9:
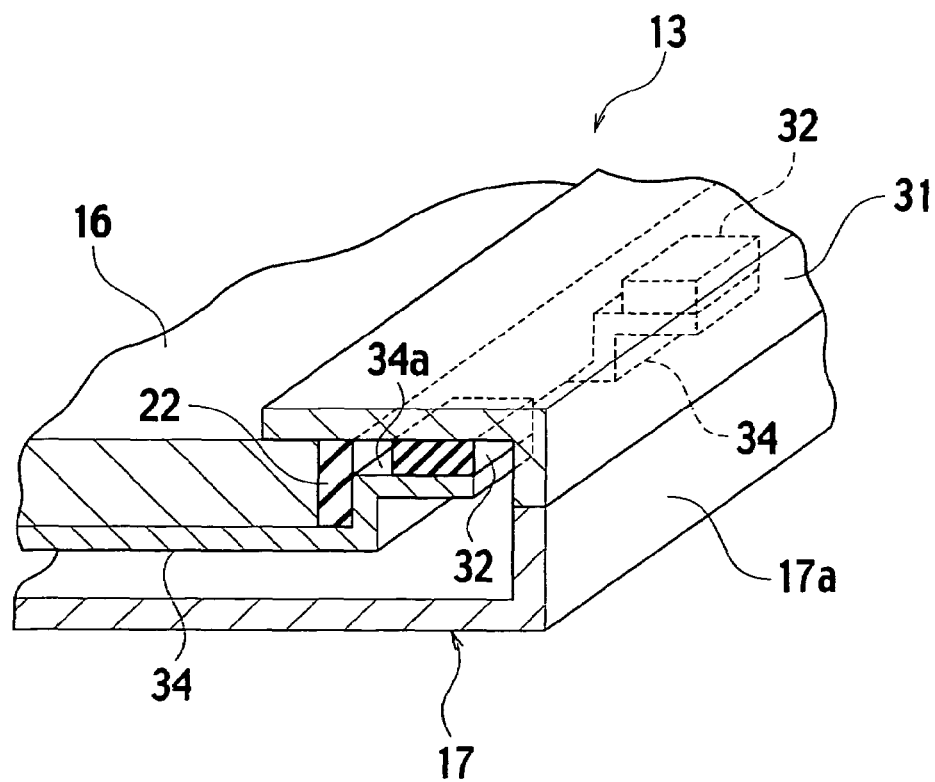
FIG. 9 is a cross section showing the arrangement of cushions and so on in a microcomputer in a second embodiment.

In a second embodiment, the microcomputer 10 includes the display panel 16 which is attached using a structure different from that of the first embodiment. Referring to FIG. 9, the display unit 13 is provided with cushions 22 which are positioned so as to be compressed when impact loads are applied from the periphery of the display unit 13, and cushions 32 which are deformed in the shearing direction. The cushions 22 and 32 can extensively reduce the spring constant in the impact load transmitting path.

Figure 10:
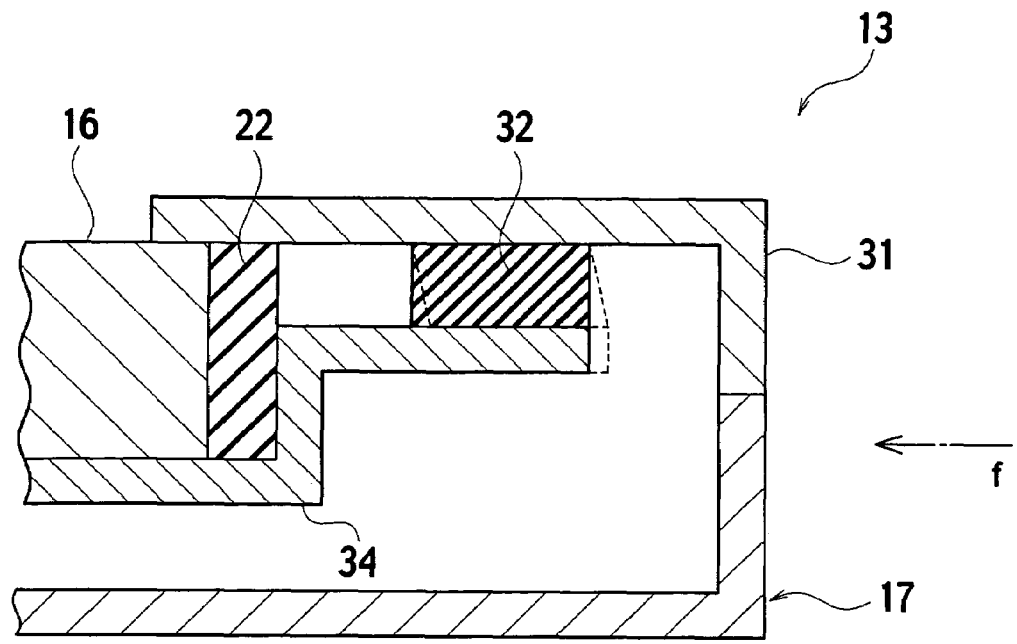
FIG. 10 is a cross section showing the deformation of the cushions of FIG. 9.

Support bars 34 bear the rear of the display panel 16. Each support bar 34 includes a surface 34a (a second support surface) and extends in the direction parallel to the display screen. A rear surface of the mask 31 (front panel) serves as a first support surface which is in parallel with the display screen. The cushions 32 are bonded between the surfaces 34a and the rear of the mask 31, thereby joining the surfaces 34a and mask 31. The cushions 32 have an elastic coefficient smaller than that of the mask 31. When impact loads "f" are applied to the periphery of the display unit 13 from an outside, some of impact loads which are parallel to the display screen elastically deform the cushions 32 in the shearing direction, as shown by dotted lines in FIG. 10. In short, the cushions 32 are extensively deformed in the shearing direction compared with the deformation in the compressing direction, which is effective in reducing the spring constant.

The foregoing structure is effective in transmitting the impact loads from the casing 17 to the display panel 16 via the impact load transmitting path constituted by the mask 31, cushions 32, supports 34, and cushions 22. The provision of the cushions 32 can extensively reduce the spring constant "k".

Figure 11:
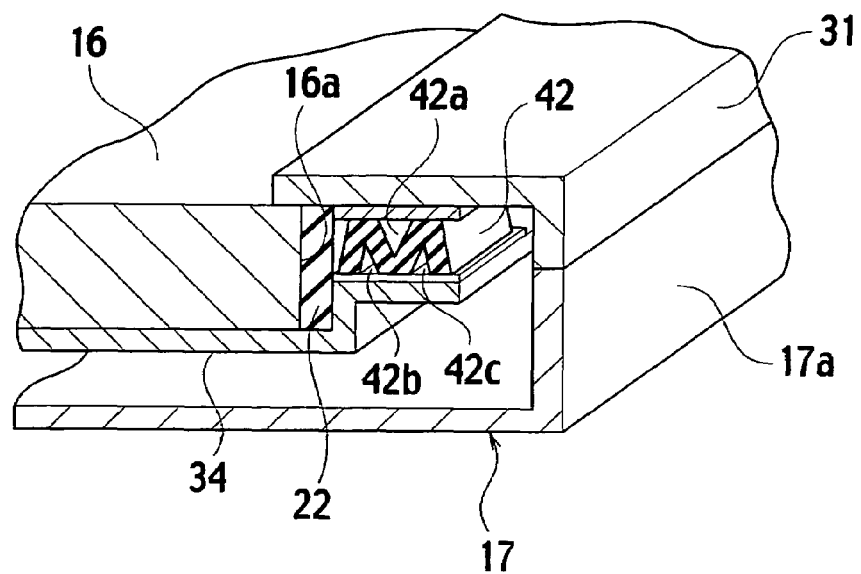
FIG. 11 is a perspective view showing another example of cushions in the second embodiment of FIG. 9.

Alternatively, angular rubber cushions 42 may be used as shown in FIG. 11 in place of the cushions 32 in the shape of a block. Each cushion 42 has notches 42a, 42b and 42c extending along a peripheral wall 16a of the display panel 16 and a peripheral wall 17a of the casing 17. The spring constant of the cushions 42 in the shearing direction is approximately 20% of the spring constant in the compressing direction. The cushions 42 are effective in extensively reducing the spring constant "k".

Figure 12:
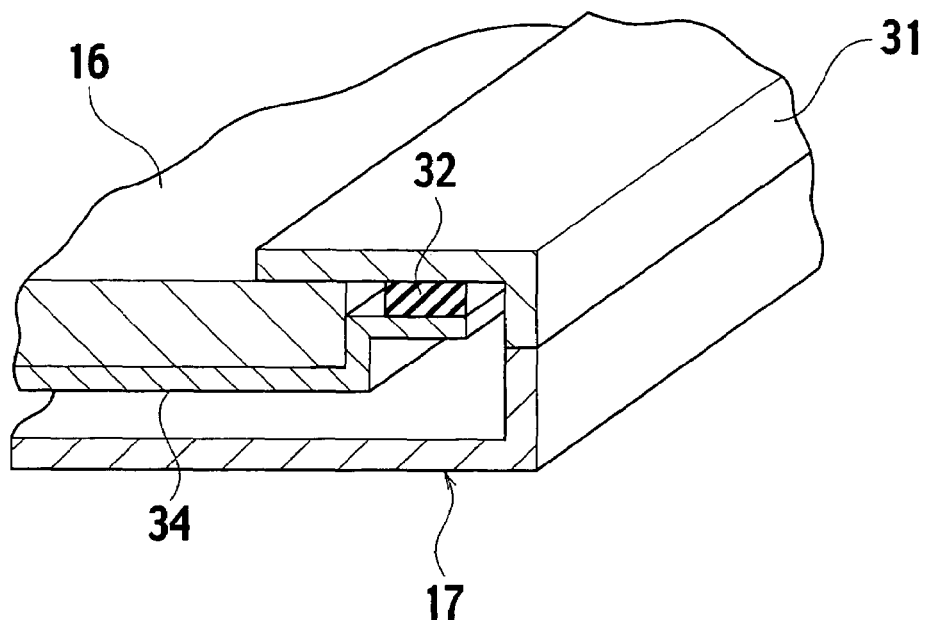
FIG. 12 is a perspective view showing how the display panel is attached in a further embodiment.
Figure 13:
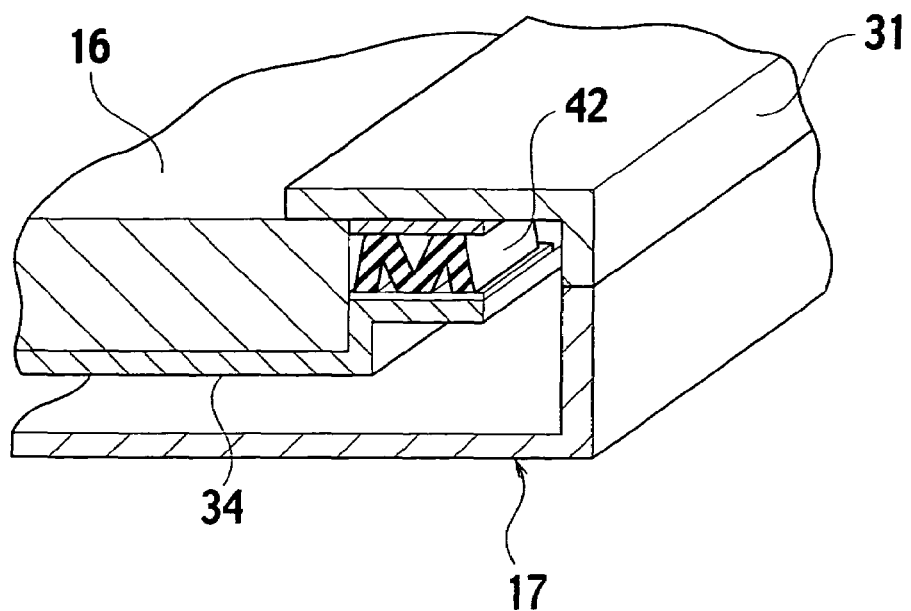
FIG. 13 is a perspective view showing how the display panel is attached in a still further embodiment.

The cushions 22 may be omitted as shown in FIGS. 12 and 13. The cushions 32 or 42 arranged in the shearing direction can sufficiently reduce the spring constant "k" in the practical use.

OTHER EMBODIMENTS

The invention has been described with reference to the first and second embodiments in which the liquid crystal display panel is utilized. Alternatively, the invention is also applicable to a variety of display units or display panels including electro luminescent elements and so on.

Further, the invention is applicable to a microcomputer comprising a keyboard and a display panel housed in one casing as well as the microcomputer 10 including the main body 12 and the display unit 13 housed in different casings which are freely opened and closed.

Figure 14:
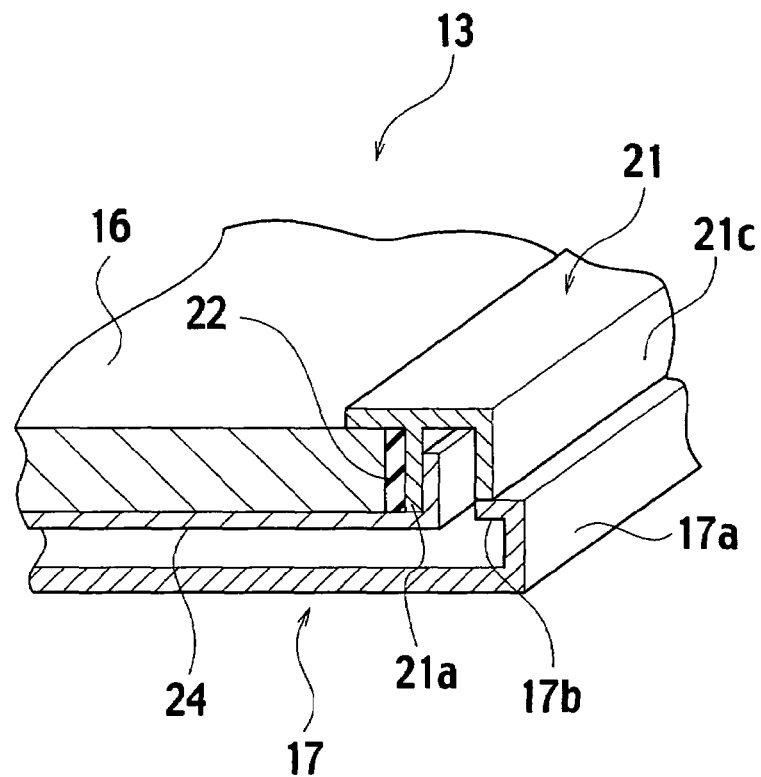
FIG. 14 is a perspective view showing how a mask is attached in a further embodiment.
Figure 15:
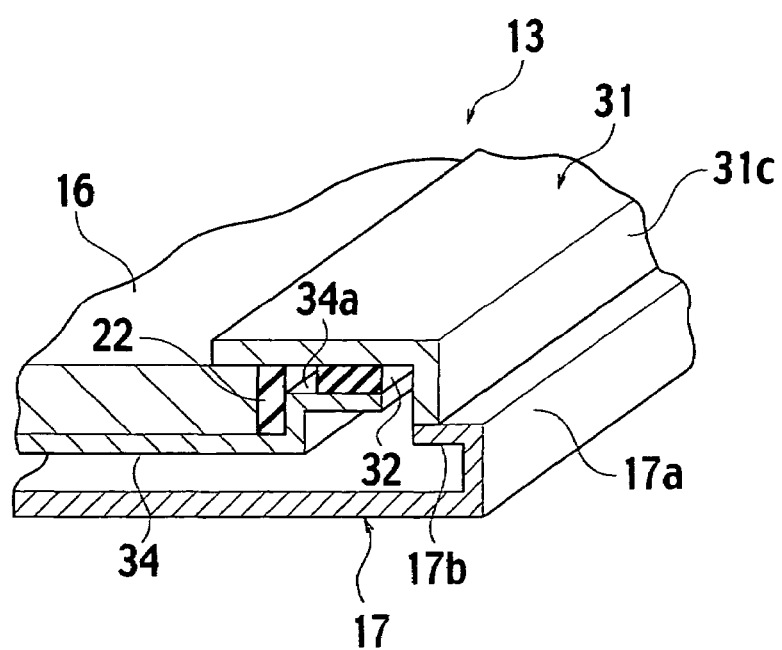
FIG. 15 is a perspective view showing how a mask is attached in a final embodiment.

In the first and second embodiments, the periphery 17a of the casing 17 is aligned with the peripheries of the masks 21 and 31. Alternatively, the peripheries of the masks 21 and 31 may be inside the periphery of the casing 17. For instance, referring to FIG. 14, the casing 17 may have folds 17b, to which the mask 21 may be joined. In this case, a periphery 21c of the mask 21 is positioned inside the periphery 17a of the casing 17. Further, as shown in FIG. 15, when the mask 31 is joined to edges of the folds 17b of the casing 17, a periphery 31c of the mask 31 is positioned inside the periphery 17a of the casing. These structures are effective in preventing the masks 21 and 31 from directly landing on the earth or the like even when the microcomputer 10 is dropped. Therefore, the masks 21 and 31 are protected against impact loads applied to the periphery of the casing 17.

What is claimed is:

1. A display unit, comprising:
   a display panel;
   a casing covering a rear surface of the display panel and being out of contact with the display panel;
   a front panel joined to the casing, extending around in front of a periphery of the display panel, and supporting the display panel, the front panel having a plurality of discrete ribs holding up the periphery of the display panel; and
   cushions provided between the ribs and the periphery of the display panel, and having a small elastic coefficient compared to the front panel,
   wherein the ribs support the display panel via the cushions.

2. The display unit of claim 1, wherein the front panel covers the periphery of a display screen of the display panel.

3. The display unit of claim 1, wherein the periphery of the front panel is positioned inside the periphery of the casing.

4. The display unit of claim 1, wherein the front panel has a small elastic coefficient compared to an elastic coefficient of the casing.

5. A display unit, comprising:
   a display panel;
   a casing covering a rear surface of the display panel and being out of contact with the display panel;
   a front panel joined to the casing, extending around in front of a periphery of the display panel;
   supports holding up the rear surface and the periphery of the display panel; and
   first cushions provided between the periphery of the display panel and the supports, and having a small elastic coefficient compared to an elastic coefficient of the front panel.

6. The display unit of claim 5, wherein the front panel covers the periphery of a display screen of the display panel.

7. The display unit of claim 5, wherein the periphery of the front panel is positioned inside the periphery of the casing.

8. The display unit of claim 5, further comprising:
second cushions interposed between the supports and the front panel, and having a small elastic coefficient compared with the elastic coefficient of the front panel.

9. The display unit of claim 5, wherein each of the first cushions is disposed between a first support surface of the front panel and a second support surface of each of the supports, the first and second support surfaces extending along the display screen.

10. A portable microcomputer, comprising:
a main body comprising a keyboard on one surface thereof;
a display unit which is freely opened and closed with respect to the main body, and comprises a display panel facing the keyboard of the main body when closed;
a casing covering the rear surface of the display panel and being out of contact with the display panel;
a front panel joined to the casing, extending around in front of a periphery of the display panel, and supporting the display panel, the front panel having a plurality of discrete ribs holding up the periphery of the display panel; and
cushions provided between the ribs and the periphery of the display panel, and having a small elastic coefficient compared to the front panel,
wherein the ribs support the display panel via the cushions.

11. The portable microcomputer of claim 10, wherein the front panel covers the periphery of a display screen of the display panel.

12. The portable microcomputer of claim 10, wherein the periphery of the front panel is positioned inside the periphery of the casing.

13. The portable microcomputer of claim 10, wherein the front panel has a small elastic coefficient compared to an elastic coefficient of the casing.

14. A portable microcomputer, comprising:
a main body with a keyboard provided on one surface thereof;
a display unit joined to the main body, being freely opened and closed, and having a display panel facing with the keyboard when the display unit is closed;
a casing covering a rear surface of the display panel and being out of contact with the display panel;
a front panel joined to the casing and extending around in front of a periphery of the display panel;
supports holding up the rear surface and the periphery of the display panel; and
first cushions provided between the periphery of the display panel and the supports, and having a small elastic coefficient compared to an elastic coefficient of the front panel.

15. The portable microcomputer of claim 14, wherein the front panel covers the periphery of a display screen of the display panel.

16. The portable microcomputer of claim 14, wherein the periphery of the front panel is positioned inside the periphery of the casing.

17. The portable microcomputer of claim 14, further comprising:
second cushions interposed between the support and the front panel, and having a small elastic coefficient compared with the elastic coefficient of the front panel.

18. The portable microcomputer of claim 14, wherein the first cushions are disposed between a first support surface of the front panel and a second support surface of each of the supports, the first and second support surfaces extending along the display screen.

* * * * *